(12) United States Patent
Adam

(10) Patent No.: US 12,523,836 B2
(45) Date of Patent: Jan. 13, 2026

(54) LOCALIZED INTELLIGENT EDGE FOR FIBER DISTRIBUTION SOLUTIONS

(71) Applicant: AFL Telecommunications LLC, Duncan, SC (US)

(72) Inventor: Sean Patrick Adam, Wrentham, MA (US)

(73) Assignee: AFL Telecommunications LLC, Duncan, SC (US)

(*) Notice: Subject to any disclaimer, the term of this patent is extended or adjusted under 35 U.S.C. 154(b) by 405 days.

(21) Appl. No.: 18/009,420

(22) PCT Filed: Jun. 8, 2021

(86) PCT No.: PCT/US2021/036385
§ 371 (c)(1),
(2) Date: Dec. 9, 2022

(87) PCT Pub. No.: WO2021/252479
PCT Pub. Date: Dec. 16, 2021

(65) Prior Publication Data
US 2023/0258898 A1    Aug. 17, 2023

Related U.S. Application Data

(60) Provisional application No. 63/036,572, filed on Jun. 9, 2020.

(51) Int. Cl.
*G02B 6/00* (2006.01)
*G02B 6/38* (2006.01)
*G02B 6/44* (2006.01)

(52) U.S. Cl.
CPC ....... *G02B 6/44524* (2023.05); *G02B 6/3895* (2013.01); *G02B 6/3897* (2013.01)

(58) Field of Classification Search
CPC .................. G02B 6/44524; G02B 6/3895; G02B 6/3897; G02B 6/00
See application file for complete search history.

(56) References Cited

U.S. PATENT DOCUMENTS

| | | | |
|---|---|---|---|
| 8,718,436 B2 | 5/2014 | Barnes et al. | |
| 2017/0139165 A1 | 5/2017 | Burgess | |
| 2018/0077472 A1 | 3/2018 | Raza et al. | |
| 2018/0128709 A1* | 5/2018 | Suzuki | G01M 11/31 |
| 2018/0283716 A1 | 10/2018 | Ribbich et al. | |

FOREIGN PATENT DOCUMENTS

EP   2306421 A1 *  4/2011  .......... H04B 10/272

OTHER PUBLICATIONS

International Search Report Corresponding with Application No. PCT/US2021/036385 on Dec. 1, 2021 (1 page).

* cited by examiner

*Primary Examiner* — Jennifer Doan
(74) *Attorney, Agent, or Firm* — Dority & Manning, P.A.

(57) ABSTRACT

An optical fiber node including: a housing; a module including a plurality of connection ports configured to be coupled with optical fibers, the module being disposed in the housing and having indicators associated with at least some of the plurality of connection ports; and a controller disposed in the housing, wherein the controller manages a database associated with the plurality of connection ports and adjusts the indicators during a wiring operation of the optical fiber node.

20 Claims, 3 Drawing Sheets

LOCALIZED INTELLIGENT EDGE FOR FIBER DISTRIBUTION SOLUTIONS

CROSS-REFERENCE TO RELATED APPLICATIONS

This application is a National Stage Patent Application of PCT/US2021/036385, filed on Jun. 8, 2021, which claims the benefit of priority to U.S. Provisional Application No. 63/036,572, filed on Jun. 9, 2020, the disclosures of all of which are incorporated by reference herein in their entireties.

FIELD

The present disclosure relates generally to systems and methods associated with optical fiber management and distribution.

BACKGROUND

Optical fiber management and distribution systems are generally passive in nature. End users depend upon clear labeling in distribution boxes or assemblies and on clear instructions identifying the required connections within the distribution boxes or assemblies. With the drive to increase fiber connection density while decreasing overall volume of the management or distribution box/container/assembly, the end user is faced with the challenge of hundreds or even thousands of optical fiber connections all contained in tight, cramped spaces.

Accordingly, improved optical fiber management systems are desired in the art. In particular, remote optical fiber managements systems which provide easy and efficient wiring operations in the field would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, an optical fiber node comprising: a housing; a module including a plurality of connection ports configured to be coupled with optical fibers, the module being disposed in the housing and having indicators associated with at least some of the plurality of connection ports; and a controller disposed in the housing, wherein the controller manages a database associated with the plurality of connection ports and adjusts the indicators during a wiring operation of the optical fiber node.

In accordance with another embodiment, a method of wiring an optical fiber node, the method comprising: inputting a wiring schematic into a controller; in response to the input wiring schematic, the controller adjusting an indicator on a module disposed in the housing, the indicator being associated with a connection port of the module; and in response to the adjusted indicator, connecting an optical fiber to the connection port associated with the indicator.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, optical fiber nodes in accordance with one or more embodiments described herein can be used to connect and manage optical fibers in the field. More particularly, the optical fiber nodes can instruct technicians regarding steps to be performed during wiring operations. The optical fiber nodes can include indicators which signal to the technician which optical fiber(s) should be moved, e.g., from a stored position to an in-use position, from an in-use position to a stored position, or between different in-use or different stored positions. The indicators may be disposed on one or more modules housed in the optical fiber node, in a parking lot of the optical fiber node, or both. The indicators can include a plurality of indicators each associated with a respective optical fiber connection port or storage location. By way of non-limiting example, the indicators can be visual indicators, such as light-emitting diodes (LEDs). A controller of the optical fiber node can selectively illuminate the visual indicators in view of a desired wiring schematic to provide easy instructions to the technician in performing a wiring operation associated with the desired wiring schematic. In such a manner, the optical fiber node can be more easily configured (e.g., wired or rewired) by a relatively low-skilled technician, in less than optimal environmental conditions, or the like.

Figure 1:
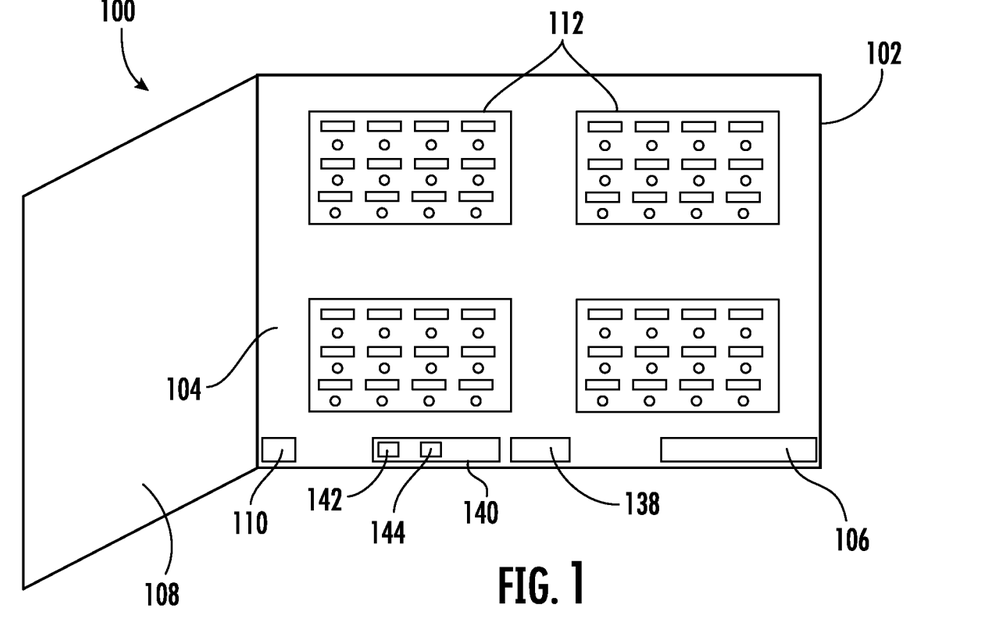
FIG. 1 is a schematic view of an optical fiber node in accordance with embodiments of the present disclosure.

Referring now to the drawings, FIG. 1 illustrates a schematic view of an optical fiber node 100 in accordance with an exemplary embodiment. The optical fiber node 100 can include, for example, an optical fiber management device, an optical fiber distribution box, an optical fiber assembly, or the like.

The optical fiber node 100 can be utilized at remote locations, e.g., along the side of a road or at another location, where there is no main power supply or data center immediately nearby. In this regard, the optical fiber node 100 can be self-contained such that the components necessary to perform the wiring operations described herein are disposed at the optical fiber node 100.

The optical fiber node 100 generally includes a housing 102 defining an internal volume 104. The housing 102 can be formed, for example, from a resilient material such as a metal, alloy, plastic, or the like. One or more optical fibers (not shown) extend into the internal volume 104, e.g., through one or more openings in open communication with an external environment. The optical fibers may be part of a single cable. In certain instances, the optical fibers may be part of a trunk cable, a drop cable, or the like. In other embodiments, the optical fibers may include a plurality of cables.

In some embodiments, the optical fiber node 100 can include a battery 106 configured to store electrical charge. The battery 106 can include, for example, a lithium-ion battery, a lead-acid battery, a nickel-cadmium battery, a nickel-metal hydride battery, or the like. The battery 106 can include a single cell or a plurality of battery cells connected in series or in parallel with one another. The battery 106 can be disposed within the housing 102. In one or more embodiments, the battery can be coupled with a photo-voltaic (PV) module (not illustrated), a wind turbine, or other energy harvesting device configured to provide electrical charge to the battery 106.

The housing 102 can include a cover 108 movable between an open position, whereby the internal volume 104 is accessible, and a closed position, whereby the internal volume 104 is inaccessible. In certain instances, the cover 108 can be selectively locked to prevent the cover 108 from being opened.

A sensor 110 may detect the status of the cover 108, i.e., detect the position of the cover 108. The sensor 110 can include a mechanical sensor, an electronic sensor, an electromechanical sensor, a visual sensor, or the like. The sensor 110 may be disposed in the internal volume 104 of the optical fiber node 100.

Current draw from the battery 106 can be less when the cover 108 is in the closed position. For instance, when the cover 108 is in the closed position, the current draw from the battery 106 can be substantially zero amps. When the sensor 110 detects the cover 108 in the open position, current draw from the battery 106 can increase as needed to perform operations described herein. In this regard, the optical fiber node 100 can form an efficient system having a low-power draw which can last upon a single battery charge for an extended period of time (e.g., years) based on power-saving design and use-model.

One or more modules, such as a plurality of modules 112, can be disposed in the internal volume 104 of the optical fiber node 100. In some embodiments, the modules 112 are arranged in a matrix, including a plurality of rows and a plurality of columns. In the illustrated, exemplary embodiment, the modules 112 are disposed in a 2×2 matrix including two columns and two rows. Other arrangements are possible. For example, the matrix may include at least three rows, such as at least four rows, such as at least five rows, such as at least six rows, such as at least seven rows, such as at least eight rows, such as at least nine rows, such as at least ten rows. Additionally, the matrix may include at least three columns, such as at least four columns, such as at least five columns, such as at least six columns, such as at least seven columns, such as at least eight columns, such as at least nine columns, such as at least ten columns.

The modules 112 may be removable from the optical fiber node 100. For instance, the modules 112 may be removable from the housing 102 for reconfiguration, maintenance, repair, or updating. By way of non-limiting example, the modules 112 may be slidably engaged with the optical fiber node 100 such that the modules 112 can be translated from the optical fiber node 100. The modules 112 may be pivotally engaged with the optical fiber node 100 such that the modules 112 may be pivoted relative to the optical fiber node 100. In certain instances, the modules 112 may be coupled to the housing 102 of the optical fiber node 100 through one or more trays (not illustrated). The trays may be adjustable relative to the housing 102 to support movement of the modules 112.

In certain instances, the modules 112 can all be the same type of module. For instance, the modules 112 can all share a common shape, size, layout, functional aspect, or any combination thereof. In other instances, one or more of the modules 112 can be different from one another.

Figure 2:
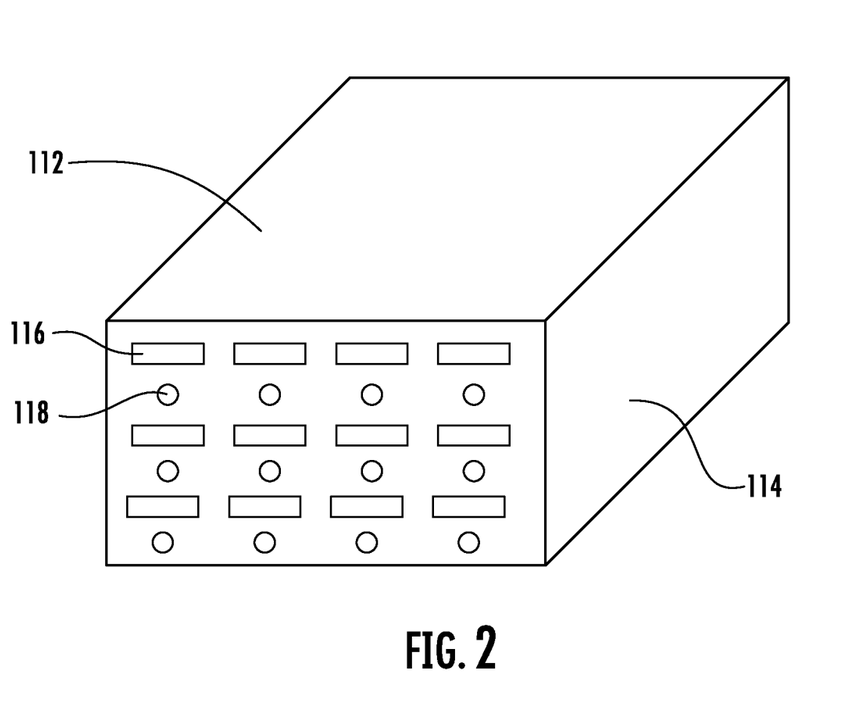
FIG. 2 is a schematic view of a module of the optical fiber node in accordance with embodiments of the present disclosure.

Referring to FIG. 2, an exemplary module 112 is depicted. The module 112 generally includes a housing 114. The housing 114 can support any one or more module features known in the art to perform one or more functions. By way of non-limiting example, the module features may include splitters, splices, wavelength-division multiplexers (WDM), or the like.

The modules 112 can further include connection ports 116 each configured to receive and connect with a free end of an optical fiber. At least one of the connection ports 116 can have an associated indicator 118. In an embodiment, each of the connection ports 116 can have an associated indicator 118. The associated indicator 118 can be unique to each connection port 116. The indicator 118 can indicate, for example, information relating to its associated connection port 116. By way of non-limiting example, the indicator 118 can include a visual indicator, a tactile indicator, an audible indicator, or the like. In a particular embodiment, the indicator 118 is a light, such as for example, a light emitting diode (LED). The indicator 118 may be selectively transitionable between two or more states or configurations in order to provide information regarding the associated connection port 116. By way of example, the indicator 118 may be transitionable between different colors, different shades or hues, different illumination patterns (e.g., pulses of light, constant light, etc.), or the like. As described in greater detail below, the indicator 118 may be used during wiring operations to signal to a technician that a particular connection port 116 is to be utilized with a particular optical fiber.

As described above, the connection ports 116 can be arranged in a matrix, including one or more rows and one or more columns along the modules 112. In an embodiment, the indicators 118 are disposed in a similar matrix arrangement. In certain instances, the indicators 118 may be disposed adjacent to their associated connection ports 116. For example, the indicators 118 may all be disposed above their associated connection ports 116, below their associated connection ports 116, to a lateral side of the connection ports 116, or any combination thereof. In other instances, the indicators 118 may form a matrix arrangement at a separate location spaced apart from the connection ports 116. For instance, the indicators 118 may form a matrix at a different location within the housing 102. In the illustrated embodiment, the indicators 118 are each disposed below their respective connection port 116.

Figure 3:
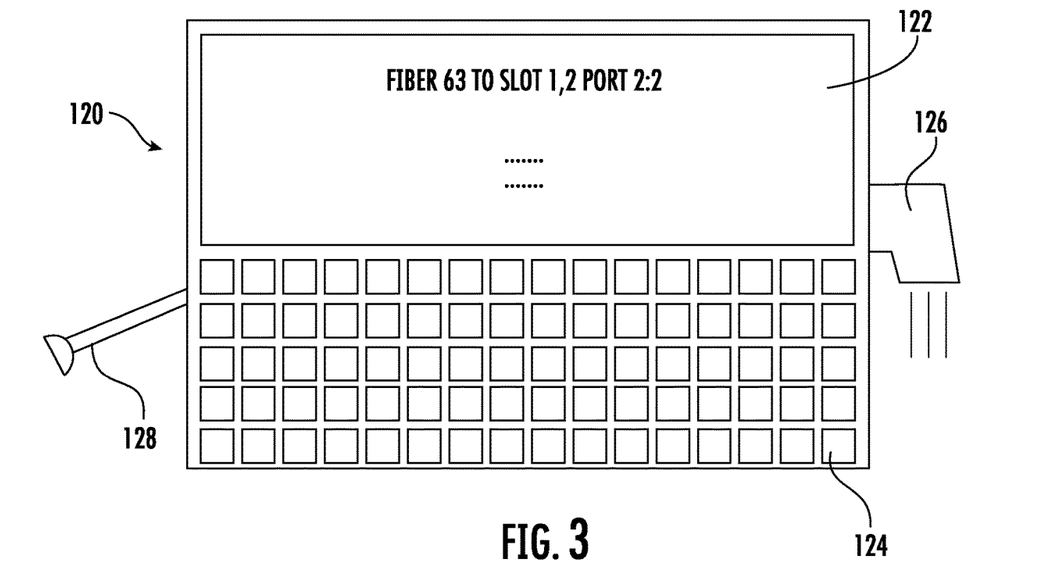
FIG. 3 is a schematic view of a user interface of the optical fiber node in accordance with embodiments of the present disclosure.

FIG. 3 illustrates an exemplary user interface 120 in accordance with an exemplary embodiment. The user interface 120 may be disposed within the housing 102 of the optical fiber node 100. The user interface 120 can include a display 122, a user input 124, a scanner 126, a connection interface 128 configured to connect with an external device (e.g., an external user input device), the like, or any combination thereof. The display 122 may include, for example, a liquid crystal display (LCD), an electroluminescent (ELD) display, a light-emitting diode (LED) display, an organic light-emitting diode (OLED) display, a plasma (PDP) display, a quantum dot (QLED) display, or the like. In certain instances, the display 122 may be a touch display.

The user input 124 may include any one or more of a keyboard, a mouse, a joystick, or another type of input system. The user input 124 may be fixed to the user interface 120 or be removable or attachable therewith. The user input 124 may include a plurality of input locations (e.g., buttons) each associated with a unique alpha-numeric character. By way of non-limiting example, the user input 124 can include a QWERTY keyboard.

The scanner 126 can include an information receiver configured to determine information associated with, e.g., a particular module 112. The scanner 126 can include, for example, a visual scanner (e.g., a barcode scanner), an RFID scanner, or the like. The scanner 126 may be integral with the optical fiber node 100, connectable therewith, or part of a remote device which is in wired or wireless communication with the optical fiber node 100.

Figure 4:
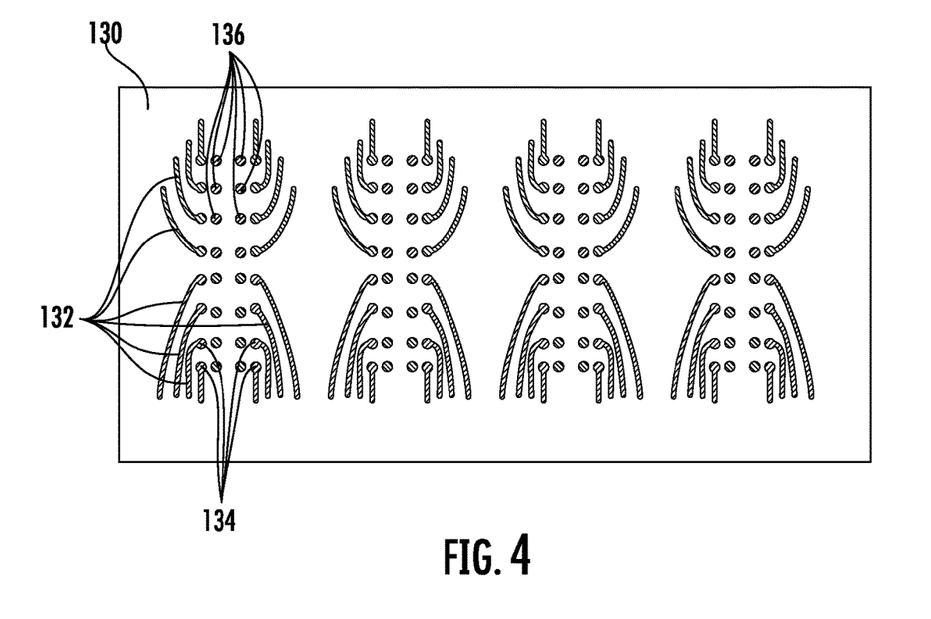
FIG. 4 is a schematic view of a parking lot of the optical fiber node in accordance with embodiments of the present disclosure.

FIG. 4 illustrates an exemplary view of a parking lot 130. The parking lot 130 can be configured to store unused optical fibers 132. That is, the parking lot 130 can receive and organize free ends of the unused optical fibers 132. In new optical fiber nodes 100, the optical fibers 132 stored in the parking lot 130 may have never been previously connected to a module 112. In in-use systems, i.e., previously commissioned optical fiber nodes 100, the parking lot 130 can store optical fibers that were never previously used, previously used and currently decommissioned, or both. In in-use systems, the technician can be instructed during decommissioning or maintenance operations, for example, to move an optical fiber 132 from one of the connection ports 116 from which the optical fiber 132 was disconnected to a storage location 134 in the parking lot 130.

By way of example, the parking lot 130 can have a plurality of storage locations 134 each configured to receive a free end of an optical fiber 132. The storage locations 134 may be arranged in a matrix, including for example, a plurality of rows and a plurality of columns. The parking lot 130 can include a plurality of indicators 136. Each indicator 136 can be associated with at least one of the plurality of storage locations 134. As illustrated in FIG. 4, the indicators 136 can be disposed adjacent to their associated storage location 134. In another embodiment, the indicators 136 may be spaced apart from the storage locations 134. For example, the indicators 136 may be arranged in a matrix disposed at a different area of the optical fiber node 100.

In an embodiment, the indicators 136 may be similar to the indicators 118 associated with the connection ports 116 on the modules 112. For example, at least one of the indicators 136 may include a visual indicator, a tactile indicator, an audible indicator, or the like. In a particular embodiment, the indicator 136 is a light, such as for example, a light emitting diode (LED). The indicator 136 may be selectively transitionable between two or more states or configurations in order to provide information regarding the associated storage location 134. By way of example, the indicator 136 may be transitionable between different colors, different shades or hues, different illumination patterns (e.g., pulses of light, constant light, etc.), or the like. As described in greater detail below, the indicator 136 may be used during wiring operations to signal to a technician that a particular storage location having an unused optical fiber 132 that is to be used with a particular connection port 116.

In an embodiment, the indicators 136 may be different than the indicators 118. For instance, by way of non-limiting example, the indicators 136 may all share a common single-color LED while the indicators 118 may be multi-colored LEDs.

In use, optical fibers 132 disposed within the optical fiber node 100 may be connected to at least one of the connection ports 116 or at least one of the storage locations 134. In this regard, the optical fiber node 100 may be organized and easier to navigate during wiring operations.

Wiring operations described in accordance with one or more embodiments may include initial wiring operations where the optical fiber node 100 is being wired for a first time with the optical fibers 132. This may occur during commissioning of the optical fiber node 100 or when the optical fibers are being replaced. In these instances, the technician is effectively installing the optical fibers in the optical fiber node 100 for the first time. Wiring operations described in accordance with one or more embodiments may also include decommissioning wiring operations where the optical fiber node 100 is being decommissioned. This may occur, for example, when the optical fiber node 100 is at the end of its effective life cycle. Decommissioning may require the technician to manage the optical fibers 132 that were previously routed within the optical fiber node 100. Management of the optical fibers 132 may involve moving the free ends of the optical fibers from the modules 112 to the parking lot 130. In certain instances, management of the optical fibers 132 during decommissioning may warrant an organized management approach, especially when a different optical fiber node is being commissioned simultaneously and the optical fibers need to be transferred to the new node. Wiring operations described in accordance with one or more embodiments may also include repair or maintenance wiring operations where the technician is repairing or maintaining a component of the optical fiber node 100 such as, e.g., one or more of the modules 112 in the optical fiber node 100. For example, it is not uncommon for modules 112 to fail after prolonged use, particularly when exposed to high operational temperatures which may occur at remote off-site locations along the side of the road where large-scale, efficient cooling is not available. When replacing a module 112, the technician must be sure to connect the new module 112 correctly or the data transmitted along the optical fibers 132 may be distorted or lost.

Accordingly, wiring operations described herein may include smart wiring operations. The term "smart wiring operation" is intended to refer to wiring operations where the optical fiber node 100, alone or in combination with a nearby device (e.g., a technician's smart device), guides the technician in the wiring operation. In a particular embodiment, smart wiring operations are performed using at least one of the aforementioned indicators 118 or 136. Relying on the indicators 118 or 136, the technician can easily wire the optical fiber node 100 correctly, following instructions provided by the optical fiber node 100. However, unlike at data centers or other centralized optical fiber locations, remote locations where the optical fiber nodes 100 described herein are deployed may lack resources (e.g., the optical fiber node 100 may rely on limited battery power) which facilitate easier wiring operations. Thus, in accordance with an embodiment described herein, wiring operations can be performed using local hardware and software at the site of the optical fiber node 100. One particular example is described below. Those of ordinary skill in the art will recognize that other arrangements and methods are possible without diverting from the scope of the disclosure.

Referring again to FIG. 1, in an embodiment, the optical fiber node 100 can further include a controller 138. The controller 138 may be disposed in the housing 102. The controller 138 may include a central processing unit (CPU) 142, a memory device 144, an operating system (not shown), or any combination thereof. In an embodiment, the memory device 144 is a non-volatile memory device such that it does not require continuous power. In this regard, the memory device 144 may store information when the optical fiber node 100 is not actively powered, e.g., the battery 106 is not experiencing active, or significant, current draw.

The controller 138 may be electrically coupled with the battery 106. In certain instances, the controller 138 may selectively draw power from the battery 106 when the cover 108 is in the open configuration. In this regard, the sensor 110 can detect the position of the cover 108 and provide power to the controller 138 when the cover 108 is detected in the open position. The controller 138 may further be in operative communication with the user interface 120, such as with the display 122, the user input 124, the scanner 126, the connection interface 128, or the like.

In an embodiment, the controller 138 can further be in communication with a communication device 140, such as a wired or wireless communication device. The communication device 140 may allow the technician to communicate with the controller 138 without using the user interface 120. The technician may utilize a smart device or personal computer (PC), local or remote, to communicate with the communication device 140. This may be particularly suitable for optical fiber nodes 100 that lack integrated user interfaces 120.

The controller 138 is configured to manage a database. The database can be at least partially locally stored, at the optical fiber node 100, for example, by the memory device 144. In an embodiment, the database is fully local, i.e., the database can be accessed regardless of whether the optical fiber node 100 is connected to a remote server location, e.g., through one or more wired or wireless communication protocols.

The database includes information associated with the optical fiber node 100. By way of non-limiting example, the database can contain information associated with one or more of the plurality of connection ports 116. The information can include at least one of: module type, module layout, a current connection map associated with a current arrangement of the optical fibers, or a past connection map associated with one or more past arrangements of the optical fibers. The module type may refer to the particular model or makeup of one or more modules 112 in the optical fiber node 100. For instance, the modules 112 may have serial numbers, names, technical information, or the like which can be delineated in the database. The module layout may refer to the particular layout of connection ports 116 or indicators 118 with respect to the modules 112. For example, the layout may refer to the number of connection ports 116 or indicators 118, the spatial layout of the connection ports 116 or indicators 118, or the like. The current connection map may define a map of the optical fibers 132 as it relates to the optical fiber node 100. For example, the database may include information regarding the connection location of one or more of the optical fibers 132. This can include whether the optical fiber 132 is being used with one of the connection ports 116 or unused (i.e., stored in the parking lot 130), which connection port 116 or storage location 134 the optical fiber 132 is connected to, or the like. By mapping the optical fiber 132 relative to the optical fiber node 100, the database can maintain organized information which allows the optical fiber node 100 to instruct the technician during wiring operations. The past connection map may include, for example, a stored map of one or more previous wiring configurations for the optical fiber node 100. This may be helpful during troubleshooting or when the optical fiber node 100 is reverted to a previous configuration. There is no limitation or restriction as to how the controller 138 operates, how the controller 138 maintains the database, or the like.

In an embodiment, the controller 138 can maintain a complete map of the current or previous connection map. This map can be queried at any time via the user interface 120 or an external device, such as a smart device or a personal computer (PC). The smart device or PC may be local, i.e., onsite at the optical fiber node 100, or disposed at a remote location. When located at a remote location, the smart device or PC can be connected to the controller 138 through a wireless communication protocol. When disposed local, i.e., onsite, the smart device or PC can be connected to the controller 138 through one or both of a wireless or wired communication protocol.

As previously described, the modules 112 may have configurations including a plurality of connection ports 116. The configuration of connection ports 116 of at least one, such as all, of the modules 112 can be stored in the database. New modules 112 introduced into the optical fiber node 100 can have their configurations loaded into the database. This may be performed manually. For example, the technician can enter information associated with the new module 112 into the database using, e.g., the display 122 or user input 124. This information may include, for example, a serial number of the new module 112, a configuration of the connection ports 116 of the new module 112, a model number of the new module 112, or the like. In another embodiment, loading configurations of the new module(s) 112 into the database can be performed at least partially autonomously, e.g., using the scanner 126. Most modules in commission today utilize a bar code or other unique code which can be read by the scanner 126. The bar codes or unique codes may be contained in attached labels, RFID tags, near field communication (NFC) tags, or the like. The scanner 126 can communicate with the CPU 142 which can determine the configuration of the scanned module based on the unique code. By way of example, the memory 144 can store information regarding different module configurations. When queried against the stored information, the configuration of the scanned module can be determined. Alternatively, or in addition, the scanned module can include information which informs the optical fiber node 100 about its particular capabilities and configuration. That is, rather than query stored information to ascertain the configuration of the scanned module, the scanned module can relay relevant information to the optical fiber node 100. This may permit future-proofing such that information about new module configurations are created upon installation. This also allows for new versions of an existing module to provide updated information which can be used potentially for pre-installed modules. Some modules may include indicators 118 having multi-color LEDs that were not previously available when the optical fiber node 100 was commissioned. In this regard, the optical fiber node 100, and more particularly the controller 138, may lack associated information regarding the configuration of the module 112. Scanning the module and receiving information from the module may thus allow for such future-proofing.

The following description relates to instances where a technician connects a new service path within the optical fiber node 100. In these situations, the optical fiber 132 to be used in the new service path may be disposed in the parking lot 130, i.e., out of commission awaiting connection. The technician interfaces with the controller 138, entering information into the controller 138 relating to the new service path. This may be performed using the display 122 or the user input 124. By way of example, the entered information may be broadly defined without discrete information regarding the exact rewiring operation. For instance, the technician may enter a general code which the CPU 142 uses to access a service path plan from the memory 144. Alternatively, the entered information may be narrowly defined, including, for example, a Path Name which contains information associated with a proper connection port 116, storage location 134, or optical fiber 132. With the new service path received by the controller 138, the controller 138 can then guide/instruct the technician on making the appropriate optical fiber connections. For instance, the controller 138 may cause the indicators 118 or 136 associated with the new service path to illuminate or change color. This can inform the technician of the proper optical fiber to be connected in view of the new service path. After completing the connection, the technician can instruct the controller 138 that the service connection was completed. At this time, the controller 138 may deactivate or otherwise adjust the indicators 118 or 136 accordingly. Alternatively, the controller 138 may be configured to monitor the connection process and assess when the connection was completed.

The instructions informed by the controller 138 may be performed sequentially. Thus, if the technician has, for example, two or more new connections to form, i.e., two or more new service paths to complete, the controller 138 may move through the connection process sequentially, instructing the technician one connection at a time. In some instances, the controller 138 may provide concurrent instructions. For instance, where the indicators 118 and 136 are multi-colored, the controller 138 may illuminate the indicators 118 and 136 for each connection path using a different color. By way of example, a first indicator 118 of a module 112 may be green to correspond with a green indicator 136 of a storage location 134 and a second indicator 118 of the module 112 may be red to correspond with a red indicator 136 of a storage location 134. The technician can thus match colors of the indicators 118 and 136 when performing the wiring operation. As noted above, the technician may instruct the controller 138 that the service connections were completed or the controller 138 may be configured to monitor the connection process and assess when the connections were completed.

The following description relates to instances where a technician disconnects a service path within the optical fiber node 100. In these situations, the optical fiber 132 to be disconnected may be part of an existing service path. That is, the optical fiber may be connected to a connection port 116 of one of the modules 112. Similar to the connection process described above, the technician can interface with the controller 138 through the user interface 120. The technician can enter information into the controller 138 relating to the existing service path. This may be performed using the display 122 or the user input 124. By way of example, the entered information may be broadly defined without discrete information regarding the exact rewiring operation. For instance, the technician may enter a general code which the CPU 142 uses to access a service path plan from the memory 144. Alternatively, the entered information may be narrowly defined, including, for example, a Path Name which contains information associated with a proper connection port 116, storage location 134, or optical fiber 132. With the information regarding the service path received by the controller 138, the controller 138 can then guide/instruct the technician on making the appropriate optical fiber connections. For instance, the controller 138 may cause the indicators 118 or 136 associated with the existing service path to illuminate or change color. This can inform the technician of the proper optical fiber to be disconnected in view of the disconnected service path. The technician can then move the optical fiber 132 to a proper storage location 134 along the parking lot 130. After completing the disconnection, the technician can instruct the controller 138 that the service disconnection was completed. At this time, the controller 138 may deactivate or otherwise adjust the indicators 118 or 136 accordingly. Alternatively, the controller 138 may be configured to monitor the disconnection process and assess when the disconnection was completed.

As with the connection process described above, the instructions informed by the controller 138 may be performed sequentially. Thus, if the technician has, for example, two or more disconnections to make, i.e., two or more service paths to disconnect, the controller 138 may move through the disconnection process sequentially, instructing the technician one disconnection at a time. In some instances, the controller 138 may provide concurrent instructions. For instance, where the indicators 118 and 136 are multi-colored, the controller 138 may illuminate the indicators 118 and 136 for each disconnection path using a different color. By way of example, a first indicator 118 of a module 112 may be green to correspond with a green indicator 136 of a storage location 134 and a second indicator 118 of the module 112 may be red to correspond with a red indicator 136 of a storage location 134. The technician can thus match colors of the indicators 118 and 136 when performing the wiring operation. As noted above, the technician may instruct the controller 138 that the service disconnections were completed or the controller 138 may be configured to monitor the disconnection process and assess when the disconnections were completed.

The following description relates to instances where a technician is maintaining or troubleshooting a service path within the optical fiber node 100. In these situations, the optical fiber 132 to be maintained or troubleshooted may be part of an existing service path. That is, the optical fiber may be connected to a connection port 116 of one of the modules 112. Similar to the connection process described above, the technician can interface with the controller 138 through the user interface 120. The technician can enter information into the controller 138 relating to the existing service path. This may be performed using the display 122 or the user input 124. By way of example, the entered information may be broadly defined without discrete information regarding the exact rewiring operation. For instance, the technician may enter a general code which the CPU 142 uses to access a service path plan from the memory 144. Alternatively, the entered information may be narrowly defined, including, for example, a Path Name which contains information associated with a proper connection port 116, storage location 134, or optical fiber 132. With the information regarding the service path received by the controller 138, the controller 138 can then guide/instruct the technician on making the appropriate optical fiber connections or disconnections. For instance, the controller 138 may cause the indicators 118 or 136 associated with the existing service path to illuminate or change color. This can inform the technician of the proper optical fiber to be disconnected in view of the disconnected service path. The technician can then move the optical fiber 132 to a proper storage location 134 or a different connection port 116 as instructed by the controller 138. After completing the maintenance or troubleshooting, the technician can instruct the controller 138 that the action was completed. At this time, the controller 138 may deactivate or otherwise adjust the indicators 118 or 136 accordingly. Alternatively, the controller 138 may be configured to monitor the process and assess when the maintenance or troubleshooting was completed.

As with the connection and disconnection process described above, the instructions informed by the controller 138 may be performed sequentially. Thus, if the technician has, for example, two or more connections or disconnections to make, i.e., two or more service paths to connect or disconnect, the controller 138 may move through the connection or disconnection process sequentially, instructing the technician one connection or disconnection at a time. In some instances, the controller 138 may provide concurrent instructions. For instance, where the indicators 118 and 136 are multi-colored, the controller 138 may illuminate the indicators 118 and 136 for each connection or disconnection path using a different color. By way of example, a first indicator 118 of a module 112 may be green to correspond with a green indicator 136 of a storage location 134 or another connection port 116 and a second indicator 118 of the module 112 may be red to correspond with a red indicator 136 of a storage location 134 or another connection port 116. The technician can thus match colors of the indicators 118 and 136 when performing the wiring operation. As noted above, the technician may instruct the controller 138 that the service was completed or the controller 138 may be configured to monitor the service process and assess when the service was completed.

In an embodiment, the controller 138 can provide easy rewiring capability between existing modules. For instance, as noted above, in some cases it may be necessary to rewire an existing optical fiber 132 from a first connection port 116 to a second connection port 116. This may be performed manually, for example, by the technician entering a service plan into the controller 138. The controller 138 can then activate the indicators 118 appropriately. This may also be performed autonomously, or partially autonomously. That is, the technician may enter a more generic code which the controller 138 uses to instruct the technician as to the reconnection service to be performed.

Either during the wiring operation or after the wiring operation is completed, the database can update to capture a new map of the optical fibers 132 within the optical fiber node 100. In some instances, the updated map may be captured manually, e.g., by the technician instructing the controller 138. In other instances, the updated map may be captured at least partially autonomously. That is, the controller 138 can be configured to automatically update in view of the services which were performed.

In certain instances, the controller 138 can be configured to store information relating to data (e.g., test data) acquired during installation, decommissioning, maintenance, or the like. The data may be recorded as part of a testing protocol whereby test equipment is connected to the optical fiber node 100. Alternatively, the data may be recorded without test equipment connected to the optical fiber node 100. The data may include information, e.g., associated with the past, current, or future wiring schematic. The data may reference information about one or more modules 112, one or more connection ports 116, one or more indicators 118, the parking lot 130, or the like. By way of example, the data may be used by a technician to recall an "as left" condition of the optical fiber node 100. In this regard, the technician can access the data, or other relevant information, when returning to a previous optical fiber node 100 or when approaching a new optical fiber node 100.

In an embodiment, the controller 138 can be configured to signal to the technician when a given part of the optical fiber node 100 is problematic. For example, the controller 138 can generate a signal at the indicator 118 when a connection port 116 has failed. The signal can include a specified (i.e., predetermined) indication color or signaling pattern to indicate to the technician that the associated connection port 116 or underlying module 112 has failed. Different signals can be indicative of different failure types.

Figure 5:
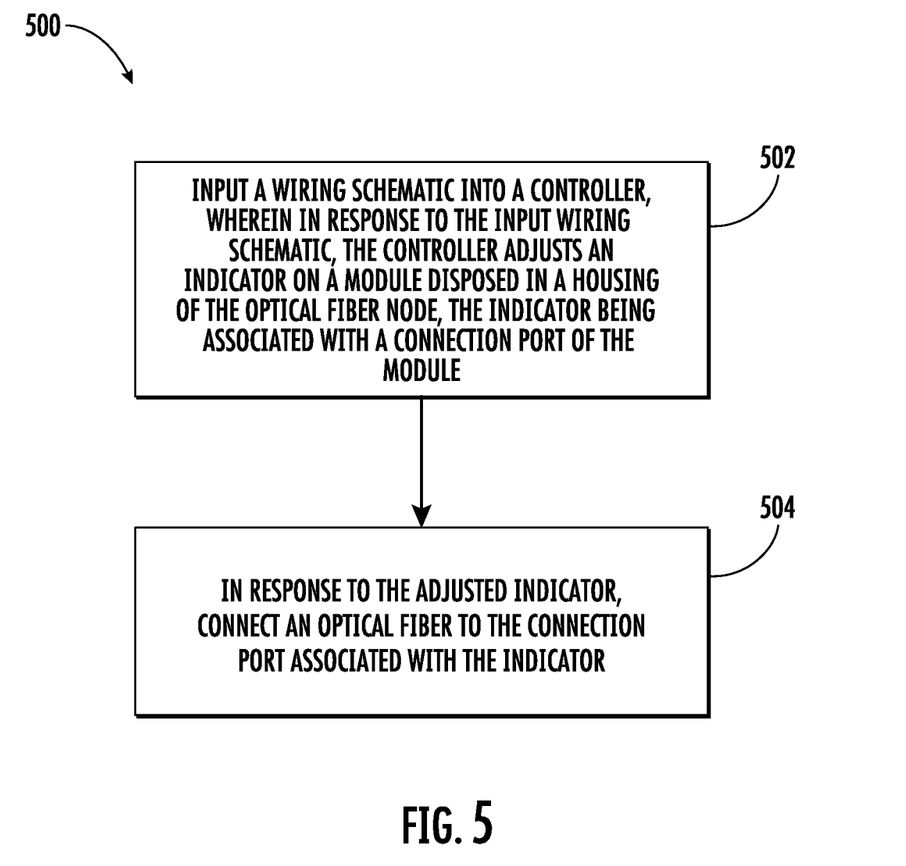
FIG. 5 is a flow chart of a method of wiring the optical fiber node in accordance with embodiments of the present disclosure.

FIG. 5 illustrates a flow chart of a method 500 of wiring an optical fiber node in accordance with an embodiment. The method 500 can generally include a step 502 of inputting a wiring schematic into a controller, wherein in response to the input wiring schematic, the controller adjusts an indicator on a module disposed in a housing of the optical fiber node in response to the input wiring schematic. The indicator can be associated with a connection port of the module. The method 500 can further include a step 504 of connecting an optical fiber to the connection port associated with the indicator in response to the adjusted indicator.

The step 502 of inputting the wiring schematic into the controller can be performed after opening a housing of the optical fiber node. When the housing is opened (e.g., a cover of the housing is pivoted to an open position), battery consumption may increase as a result of components in the optical fiber node becoming active. The step 502 of inputting the wiring schematic into the controller can be performed manually, autonomously, or semi-autonomously. For manual input, the technician can enter the wiring schematic into the optical fiber node using, e.g., a user interface of the optical fiber node. The technician may alternatively, or in addition, enter the wiring schematic manually using a remote device, such as a smart device. The smart device can be in communication with the controller through wired or wireless protocols. For autonomous or semi-autonomous input, the technician may scan or otherwise introduce the wiring schematic using a scanner or other input device of the optical fiber node. For instance, the technician may have a manual with a preset list of wiring schematics. The technician can scan a particular wiring schematic to the optical fiber node which can then use the input information to adjust the indicator.

Adjustment of the indicator may include changing a state or status of the indicator. For instance, the indicator may include a visual indicator, e.g., an LED. The controller can adjust the appropriate LED(s) to instruct the technician on a correct operation to perform. For instance, the controller may illuminate a previously off-LED to indicate that the associated connection port is to be used. The controller may change a color of the LED to indicate that the associated connection port is to be used. The controller may change the LED from a solid light to a flashing light, or the like.

In commissioning operations, for example, the step 504 of connecting the optical fiber to the connection port can include selecting a free of an unused optical fiber stored in the parking lot and connecting the free end with the connection port having the adjusted indicator. Selection of the free end of the unused optical fiber stored in the parking lot may be performed in response to an adjusted indicator in the parking lot associated with the free end of the unused optical fiber. That is, the controller can determine which unused optical fiber is to be used and indicate the same to the technician.

In certain instances, the technician can instruct the controller of completion of the current wiring step. In other instances, the controller can detect completion of the current wiring step.

The controller can manage a database associated with the connection ports. In certain instances, the step 502 of adjusting the indicator can be performed by the controller in view of the database and the input wiring schematic. That is, the controller can use an existing map of the optical fibers in addition to the input wiring schematic when determining which indicators to adjust. Information in the database can include at least one of module type, module layout, a current connection map associated with a current arrangement of optical fibers, or a past connection map associated with one or more past arrangements of the optical fibers.

In some instances, the optical fiber node can be in wired or wireless communication with a remote server or remote support. The controller may communicate with the remote server or remote support to receive the wiring schematic, support relating to the wiring schematic or wiring operation, or both. In some instances, the controller can be in communication with the remote server or remote support through a smart device, e.g., a smart phone of the technician.

The embodiments described herein may allow for local mapping of fiber connections. The embodiments described herein may also allow technicians to more easily perform wiring operations by instructing the technician of exact wiring operations to perform and indicating which wires are to be operated upon. Especially in densely packed housings 102, use of indicators 118 or 136 may allow for quicker and easier installation. Moreover, with the number of technicians in the field growing every year, the average level of technician experience is decreasing. Thus, easy to use optical fiber nodes 100 are imperative. This is particularly true for instances where technicians are deployed to optical fiber nodes 100 in less than ideal environmental conditions, such as at night, in rain or snow, or during other poor visibility occasions.

Further aspects of the invention are provided by one or more of the following embodiments:

Embodiment 1. An optical fiber node comprising: a housing; a module including a plurality of connection ports configured to be coupled with optical fibers, the module being disposed in the housing and having indicators associated with at least some of the plurality of connection ports; and a controller disposed in the housing, wherein the controller manages a database associated with the plurality of connection ports and adjusts the indicators during a wiring operation of the optical fiber node.

Embodiment 2. The optical fiber node of embodiment 1, wherein the module comprises a plurality of modules, and wherein each module of the plurality of modules comprises: a plurality of connection ports; and indicators associated with at least some of the plurality of connection ports.

Embodiment 3. The optical fiber node of embodiment 1, wherein at least one of the indicators includes a visual indicator.

Embodiment 4. The optical fiber node of embodiment 1, wherein the database contains information associated with the plurality of connection ports, the information including at least one of: module type, module layout, a current connection map associated with a current arrangement of the optical fibers, or a past connection map associated with one or more past arrangements of the optical fibers.

Embodiment 5. The optical fiber node of embodiment 1, wherein the optical fiber node further comprises a user interface configured to receive inputs from an operator during wiring operations, the inputs being associated with a wiring schematic for the optical fiber node, and wherein the controller is configured to adjust the indicators in view of the wiring schematic.

Embodiment 6. The optical fiber node of embodiment 1, wherein the optical fiber node further comprises a parking lot configured to store unused optical fibers, wherein the parking lot includes a plurality of indicators, each indicator being associated with at least one of the unused optical fibers, and wherein the indicators of the parking lot are in communication with the controller, the controller adjusting the indicators of the parking lot during wiring operations of the optical fiber node.

Embodiment 7. The optical fiber node of embodiment 1, wherein the controller is battery powered.

Embodiment 8. A method of wiring an optical fiber node, the method comprising: inputting a wiring schematic into a controller; wherein in response to the input wiring schematic, the controller adjusting an indicator on a module disposed in a housing of the optical fiber node, the indicator being associated with a connection port of the module; and in response to the adjusted indicator, connecting an optical fiber to the connection port associated with the indicator.

Embodiment 9. The method of embodiment 8, wherein connecting the optical fiber to the connection port associated with the indicator is performed by selecting a free end of an unused optical fiber stored in a parking lot and connecting the free end with the connection port.

Embodiment 10. The method of embodiment 9, wherein selecting the free end of the unused optical fiber stored in the parking lot is performed in response to an adjusted indicator in the parking lot associated with the free end of the unused optical fiber.

Embodiment 11. The method of embodiment 8, wherein the controller manages a database associated with the connection port, and wherein adjusting the indicator is performed by the controller in view of information from the database and the input wiring schematic.

Embodiment 12. The method of embodiment 11, wherein the information from the database includes at least one of: module type, module layout, a current connection map associated with a current arrangement of optical fibers, or a past connection map associated with one or more past arrangements of the optical fibers.

Embodiment 13. The method of embodiment 8, wherein inputting the wiring schematic into the controller is performed through a user interface.

Embodiment 14. The method of embodiment 13, wherein the user interface is disposed in the optical fiber node.

Embodiment 15. The method of embodiment 13, wherein the user interface comprises a remote smart device in communication with the controller.

Embodiment 16. The method of embodiment 8, wherein inputting the wiring schematic into the controller is performed after opening a housing of the optical fiber node, and wherein opening the housing of the optical fiber node increases a rate of battery consumption by the controller.

Embodiment 17. The method of embodiment 8, wherein inputting the wiring schematic into the controller is performed as part of an initial connection operation of the optical fiber node, a decommissioning operator of the optical connection node, a maintenance or repair operation of the optical connection node, or any combination thereof.

Embodiment 18. The method of embodiment 8, wherein the indicator comprises a visual indicator, and wherein adjusting the indicator comprises illuminating the visual indicator.

Embodiment 19. The method of embodiment 8, further comprising: in response to the input wiring schematic, the controller adjusting an indicator associated with a parking lot disposed in the housing; and in response to the adjusted indicator, connecting a disconnected optical fiber to a space in the parking lot associated with the adjusted indicator.

Embodiment 20. The method of embodiment 8, wherein the controller is disposed in a housing of the optical fiber node.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of wiring an optical fiber node, the method comprising:
    inputting a wiring schematic into a controller; wherein in response to the input wiring schematic, the controller causing a visual indicator on a module disposed in a housing of the optical fiber node to illuminate, the indicator being associated with a connection port of the module; and
    in response to the illuminated indicator, connecting an optical fiber to the connection port associated with the indicator.

2. The method of claim 1, wherein connecting the optical fiber to the connection port associated with the indicator is performed by selecting a free end of an unused optical fiber stored in a parking lot and connecting the free end with the connection port.

3. The method of claim 2, wherein selecting the free end of the unused optical fiber stored in the parking lot is performed in response to an adjusted indicator in the parking lot associated with the free end of the unused optical fiber.

4. The method of claim 1, wherein the controller manages a database associated with the connection port, and wherein adjusting the indicator is performed by the controller in view of information from the database and the input wiring schematic.

5. The method of claim 4, wherein the information from the database includes at least one of: module type, module layout, a current connection map associated with a current arrangement of optical fibers, or a past connection map associated with one or more past arrangements of the optical fibers.

6. The method of claim 1, wherein inputting the wiring schematic into the controller is performed through a user interface.

7. The method of claim 6, wherein the user interface is disposed in the optical fiber node.

8. The method of claim 6, wherein the user interface comprises a remote smart device in communication with the controller.

9. The method of claim 1, wherein inputting the wiring schematic into the controller is performed after opening a housing of the optical fiber node, and wherein opening the housing of the optical fiber node increases a rate of battery consumption by the controller.

10. The method of claim 1, wherein inputting the wiring schematic into the controller is performed as part of an initial connection operation of the optical fiber node, a decommissioning operator of the optical connection node, a maintenance or repair operation of the optical connection node, or any combination thereof.

11. The method of claim 1, further comprising:
    in response to the input wiring schematic, the controller adjusting an indicator associated with a parking lot disposed in the housing; and in response to the adjusted indicator, connecting a disconnected optical fiber to a space in the parking lot associated with the adjusted indicator.

12. The method of claim 1, wherein the controller is disposed in a housing of the optical fiber node.

13. A method of wiring an optical fiber node, the method comprising:
- receiving, at a controller, an input associated with a wiring schematic;
- in response to receiving the wiring schematic, adjusting, by the controller, an indicator on a module disposed in a housing of the optical fiber node, the indicator being associated with a connection port of the module; and
- in response to the adjusted indicator, connecting an optical fiber to the connection port associated with the indicator by selecting a free end of an unused optical fiber stored in a parking lot and connecting the free end with the connection port.

14. The method of claim 13, wherein selecting the free end of the unused optical fiber stored in the parking lot is performed in response to an adjusted indicator in the parking lot associated with the free end of the unused optical fiber.

15. The method of claim 13, wherein the indicator is a visual indicator, and wherein adjusting the indicator comprises illuminating the visual indicator.

16. The method of claim 13, wherein the controller manages a database associated with the connection port, and wherein adjusting the indicator is performed by the controller in view of information from the database and the input wiring schematic, and wherein the information from the database includes at least one of: module type, module layout, a current connection map associated with a current arrangement of optical fibers, or a past connection map associated with one or more past arrangements of the optical fibers.

17. A method of wiring an optical fiber node, the method comprising:
- receiving, at a controller, a wiring schematic;
- in response to receiving the wiring schematic, obtaining information from a database, wherein the information from the database includes at least one of: a module type, a module layout, a current connection map associated with a current arrangement of optical fibers, or a past connection map associated with one or more past arrangements of the optical fibers;
- in view of the obtained information, adjusting an indicator on a module disposed in a housing of the optical fiber node, the indicator being associated with a connection port of the module; and
- in response to the adjusted indicator, connecting an optical fiber to the connection port associated with the indicator.

18. The method of claim 17, wherein the indicator is a visual indicator, and wherein adjusting the indicator comprises illuminating the visual indicator.

19. The method of claim 17, wherein connecting the optical fiber to the connection port associated with the indicator is performed by selecting a free end of an unused optical fiber stored in a parking lot and connecting the free end with the connection port.

20. The method of claim 17, wherein the optical fiber node comprises a housing configured to receive one or more modules, and wherein wiring the optical fiber node is performed in view of a newly configured arrangement of the one or more modules.

\* \* \* \* \*